CHARLES SEDGWICK.
Ear Muffs.

No. 125,339. Patented April 2, 1872.

Witnesses:

Inventor:
Charles Sedgwick 125,339

UNITED STATES PATENT OFFICE.

CHARLES SEDGWICK, OF NEW YORK, N. Y.

IMPROVEMENT IN EAR-MUFFS.

Specification forming part of Letters Patent No. 125,339, dated April 2, 1872.

Specification describing an Improvement in Ear-Muffs, invented by CHARLES SEDGWICK, of New York, in the county of New York and State of New York.

My invention consists of the application or provision of one or more holes through the muffs used for protecting the ears of the human subject from cold, to avoid the obstruction of sound and consequent difficulty of hearing now experienced in wearing such muffs, for which many object to wearing them who otherwise would not; also, to admit the air sufficiently to prevent the ears from being uncomfortably warm, which is sometimes the case in wearing the ear-muffs now in use, and also to remove the unpleasant sensation caused by having the ears too closely covered.

My said invention is alike applicable to the muffs which are attached to hats or caps and those attached to the ears by elastic cords or bands.

Figure 1:
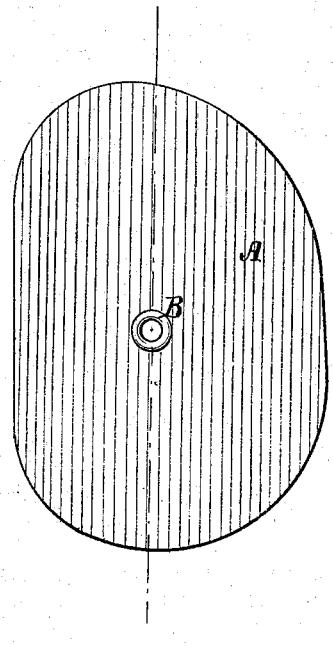
Figure 2:

Figure 1 is a side elevation of an ear-muff provided with a hole for the admission of sound according to my invention, and Fig. 2 is a transverse section.

A is the muff, which may in all respects, except the hole or holes, be made like the muffs now used. B represents a hole through it, to be located in any part best calculated to promote the desired object, or as may be preferred for any cause; or two or more may be employed in different locations. As only the exterior portions of the lobe of the ear are sensitive to cold, it is believed that the air admitted through these holes for sound will not in any material sense interfere with keeping the aforesaid sensitive parts of the ear warm. These holes may be finished with a button-hole stitch or metal eyelets, or guarded in any equivalent way against closing or partially closing up by loose edges of the cloth being pressed or in any way working together, as might be the case without such finishing. If preferred, the holes may be covered with fine wire or other gauze, to break the force of the wind, keep out the dust, and the like.

Besides admitting sound freely, and because of it, the very unpleasant sensation experienced by all when the ears are closely covered is avoided.

Having thus described my invention, I claim as new and desire to secure by Letters Patent—

As a new manufacture, ear-muffs with one or more holes to admit sound, substantially as specified.

CHARLES SEDGWICK.

Witnesses:
 ANSON P. THAYER,
 L. S. MABEE.